ary Examiner—Richard B. Lazarus
United States Patent [19]
Maroschak

[11] 3,859,025
[45] Jan. 7, 1975

[54] APPARATUS FOR MAKING CORRUGATED PLASTIC PIPES WITH INTEGRAL COUPLER COLLAR

[76] Inventor: Ernest J. Maroschak, P.O. Box 878, Roseboro, N.C. 28382

[22] Filed: Dec. 20, 1972

[21] Appl. No.: 316,825

Related U.S. Application Data

[63] Continuation of Ser. No. 271,225, July 13, 1972.

[52] U.S. Cl................425/302 B, 425/326 B, 425/DIG. 206, 425/DIG. 211, 425/DIG. 233
[51] Int. Cl............................................B29d 23/03
[58] Field of Search..............................425/326, 425/326 B, 302 B, 302, 142, DIG. 211, DIG. 233, DIG. 206

[56] References Cited
UNITED STATES PATENTS

| | | | |
|---|---|---|---|
| 3,286,305 | 11/1966 | Seckel | 425/326 |
| 3,399,262 | 8/1968 | Quackenbush | 425/392 X |
| 3,400,426 | 9/1968 | Boggs | 425/142 X |
| 3,705,779 | 12/1972 | Van Zon | 425/326 |
| 3,714,311 | 1/1973 | Stefanka | 425/326 X |

Primary Examiner—Richard B. Lazarus
Attorney, Agent, or Firm—Parrott, Bell, Seltzer, Park & Seltzer

[57] ABSTRACT

Apparatus for making plastic pipes having an elongate tubular corrugated body and a relatively short integral enlarged coupler collar on one end of the body. The apparatus includes an extruder for continuously extruding a tube of plastic material and a blow molding zone for receiving the extruded tube and which is defined by a plurality of pairs of cooperating die blocks. The die blocks are arranged in respective opposing endless series with abutting cooperating pairs of die blocks defining a composite mold cavity adapted for forming the tube into a series of successive closely spaced elongate tubular corrugated bodies with a single intergral relatively short enlarged coupler collar interconnecting adjacent tubular corrugated bodies. The apparatus additionally includes a cutting station for transversely severing the molded tube at the juncture between one end of each successive collar and the adjoining tubular corrugated body to form a plurality of lengths of pipe each having a tubular corrugated body and an integral, enlarged coupler collar on one end of the body.

10 Claims, 8 Drawing Figures

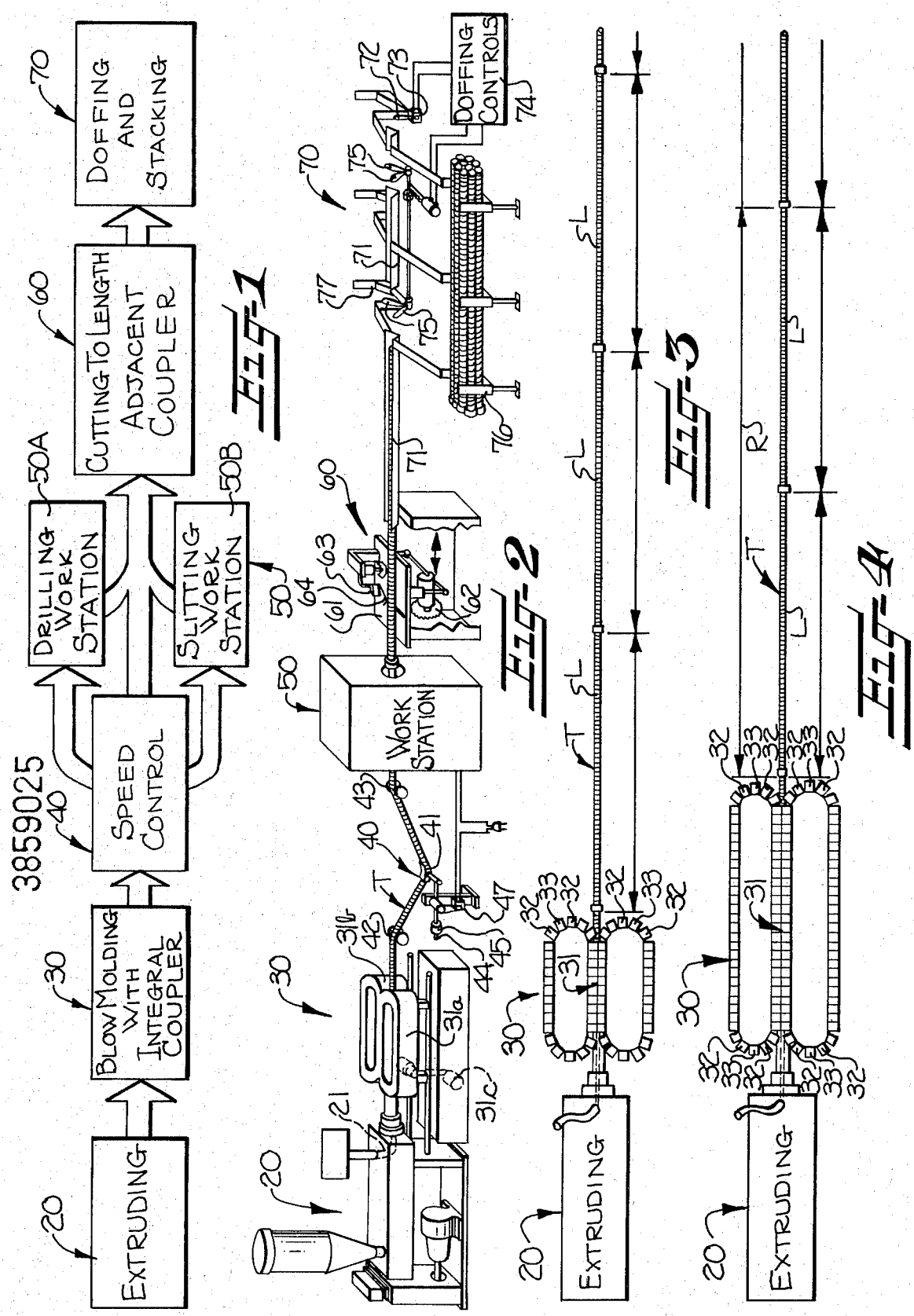

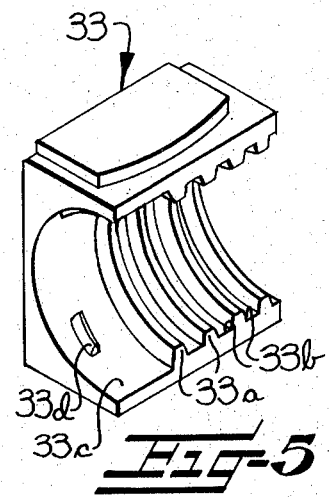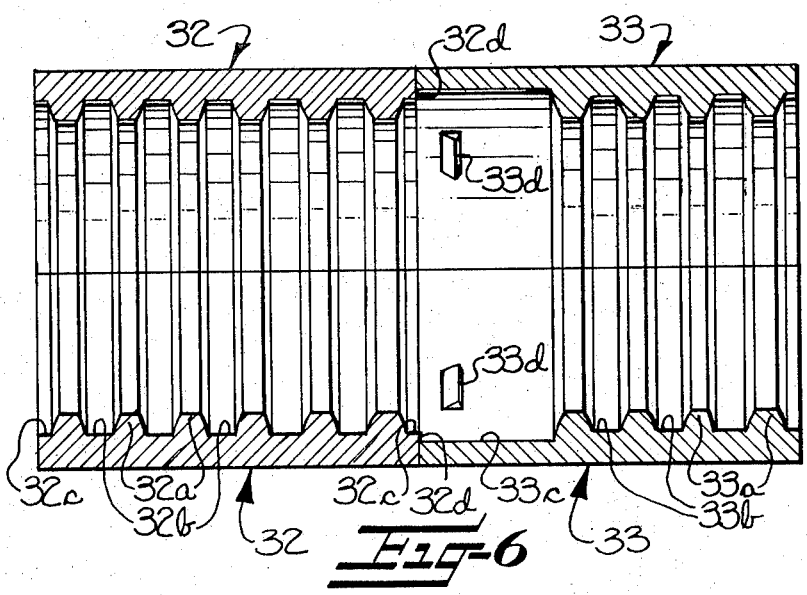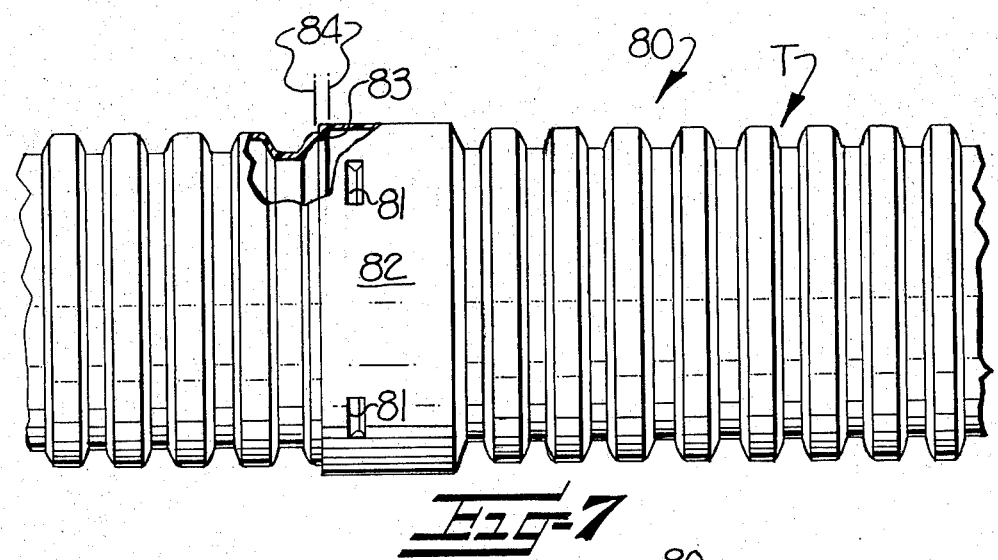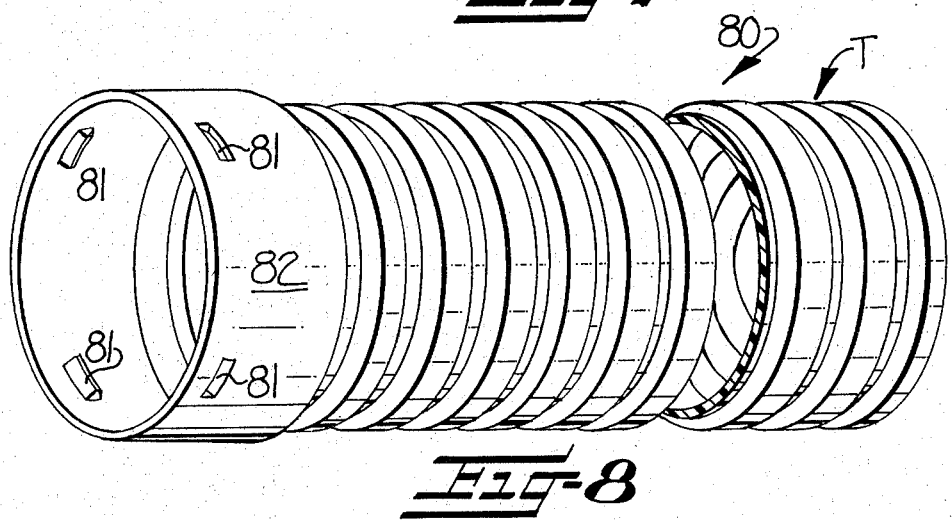

APPARATUS FOR MAKING CORRUGATED PLASTIC PIPES WITH INTEGRAL COUPLER COLLAR

This application is a continuation-in-part of my co-pending application Ser. No. 271,225, filed July 13, 1972, and entitled Method and Apparatus for Making Corrugated Plastic Pipe with Integral Coupler Collars.

This invention relates to a novel apparatus for making plastic pipes having a tubular corrugated plastic body with a relatively enlarged coupler collar integrally formed at one end of the plastic body.

It has previously been the practice to employ separate coupler elements to interconnect corrugated plastic pipes of the type used for drainage or irrigation purposes. In my co-pending application Ser. No. 271,225 filed July 13, 1972, a method and apparatus is disclosed for making corrugated plastic pipes with integral enlarged coupler collars wherein plastic tubing is extruded into a blow molding machine comprising two endless series of cooperating pairs of forwardly moving die blocks, and a pair of enlarged coupler collars are molded side-by-side at intervals along the plastic tube with the remainder of the tube between successive pairs of collars being molded into annular corrugations. The tube is subsequently severed to separate the pair of coupler collars. The tube is also severed in the corrugated portion intermediate two successive pairs of coupler collars. Thus, a series of corrugated plastic pipes are formed, each having integrally formed at one end thereof an enlarged coupler collar.

According to the present invention, corrugated plastic pipes having integral enlarged coupler collars are produced by an apparatus which is considerably more versatile than the apparatus of my above-mentioned earlier-filed application. Accordingly to the apparatus of this earlier-filed application, when it is desired to form a pipe having a length of approximately 10 feet, a each endless series of die blocks must have an overall effective length of about 20 feet so that a pair of coupler collars is formed at approximate 20 foot intervals on the tube being molded. According to the present invention, a considerably shorter blow molding machine may be employed if desired to form the same 10 foot length of pipe. In a first embodiment of the invention, the endless series of die blocks may have an overall effective length of approximately 10 feet so that a complete cycle or revolution of the die blocks produces a single length of pipe. Alternatively, a longer blow molding machine may be employed with the die blocks being arranged so that a complete cycle or revolution of the die block forms two successive lengths of pipe, with each having an integral enlarged coupler collar at one end thereof.

It is therefore an object of this invention to provide an apparatus for continuously making plastic pipes having an elongate tubular corrugated body and a relatively short integral enlarged coupler collar on one end of the body, wherein the apparatus comprises an extruder for continuously extruding plastic material in the form of a tube and a plurality of cooperating pairs of forwardly moving die blocks defining a blow molding zone for receiving the tube, the cooperating pairs of die blocks being arranged in respective opposing endless series with the die blocks in each series being in abutting relation, and wherein most of the die blocks in each series are pipe body-forming die blocks and have a concave semicircular corrugated mold surface which cooperates with the jold surface of the other die block of the same pair in the opposing series to form an annular corrugated mold cavity. The body-forming die blocks are successively arranged in each respective opposing series in abutting relation with certain adjacent body-forming die blocks being spaced apart to receive therebetween a collar-forming die block. At least one other die block in each of the respective opposing series is a collar-forming die block and is positioned between the spaced apart body forming die blocks and has its opposite ends abutting the spaced apart body-forming die blocks. The collar-forming die block has a concave semicircular relatively smooth non-corrugated mold surface which cooperates with the mold surface of the other die block of the same pair in the opposing series to form a mold cavity of greater diameter than the corrugated mold cavities. The collar forming die block also includes a set of arcuately spaced, relatively small projections extending inwardly from the relatively smooth non-corrugated mold surface adjacent one end of the die block for forming a corresponding set of latching members projecting inwardly from each collar being molded. The apparatus also comprises means to introduce fluid under pressure into the tube to expand the same against the mold cavities and thereby form a series of successively, closely spaced elongate tubular corrugated bodies with interconnecting relatively short enlarged collars between adjacent corrugated tubular bodies, and further comprises tube severing means spaced downstream of the molding zone for successively transversely severing the tube along the juncture between the end of the collar having the latching members adjacent thereto and the adjoining tubular corrugated body to thereby form a plurality of pipes, each having an elongate tubular corrugated body and a relatively short integral enlarged coupler collar on one end of the body.

Some of the objects of the invention having been stated, other objects will appear as the description proceeds when taken in connection with the accompanying drawings, in which:

FIG. 1 is a block diagram of the method and apparatus for making plastic pipes with integral coupler collars in accordance with this invention;

FIG. 2 is a schematic perspective view of an arrangement of the apparatus according to the invention;

FIG. 3 is a schematic plan view of the extruder and blow molding machine according to one embodiment of the invention;

FIG. 4 is a schematic plan view of the extruder and blow molding machine according to a second embodiment of the invention;

FIG. 5 is a perspective view of a collar-forming die block according to the invention;

FIG. 6 is a side elevation view showing a body-forming die block and a collar-forming die block in abutting relation as employed in accordance with this invention;

FIG. 7 is a plan view showing a portion of the corrugated plastic tube molded by the apparatus of this invention; and FIG. 8 is a perspective view of a corrugated plastic pipe produced by the apparatus of this invention.

Referring more specifically to the drawings, and especially to FIG. 2, an extruding machine 20 is arranged to continuously extrude and feed a tube of softened thermoplastic material to a blow molding machine broadly designated at 30. The blow molding machine is of a well-known type which successively forms annular corrugations on the tube being extruded from the extruding machine 20 as the tube is received in an elongate blow molding zone, broadly designated at 31, formed by a plurality of pairs of cooperating substantially semi-tubular mold sections or die blocks arranged in abutting end-to-end relation in each of two opposing series 31a, 31b. Conventional drive means, shown schematically at 31c, is provided for moving the two series of die blocks along respective endless paths with the proximal runs of reaches of such paths extending in a substantially straight path aligned with the nozzle of extruding machine 20 and forming the blow molding zone 31.

As is well known, the die blocks in the two series 31a, 31b move forwardly together along the substantially straight molding zone 31 where they are formed into cooperating pairs with each cooperating pair forming a single mold cavity and with the cavities of all the cooperating pairs of die blocks in the molding zone abutting to form an elongate composite mold cavity. As is conventional, the extruder is provided with suitable air pressure means 21 for introducing compressed air or other fluid under pressure into the tube being extruded to expand and mold the tube against the wall of the composite mold cavity.

Most of the die blocks in each series are body-forming die blocks and have an annularly corrugated mold surface with alternating ribs and valleys over the surface thereof. As explained more fully hereinafter, each of these die blocks cooperates with the corresponding die block of the same pair in the opposing series to form an annularly corrugated mold cavity. At least one of the die blocks in each series is a collar-forming die block and has a concave semicircular mold surface which includes a non-corrugated relatively smooth portion adjacent one end of the die block. As is also more fully described hereinafter, this die block cooperates with the corresponding die block of the same pair in the opposing series to form a mold cavity having a relatively smooth non-corrugated, generally cylindrical portion at one end thereof. The collar-forming die blocks are also provided with a set of arcuately spaced, relatively small projections extending inwardly from the relatively smooth portion of the mold surface which are adapted for forming a corresponding set of inwardly projecting latching members on the collar being molded thereagainst.

The body-forming die blocks are successively arranged in each series in abutting relation with certain adjacent body-forming die blocks being spaced apart to receive therebetween a collar-forming die block. The collar-forming die block is positioned between adjacent spaced apart body-forming die blocks with its opposite ends abutting the spaced apart body-forming die blocks. When the die blocks in such an arrangement are moved in the series along their respective endless paths they form a composite mold cavity of a configuration which molds the tube into a series of successive closely spaced elongate corrugated tubular bodies with interconnecting relatively short enlarged non-corrugated collars between the adjacent corrugated tubular bodies.

The thus molded tube T is delivered from the molding zone 31 by the forwardly moving cooperating pairs of die blocks at a predetermined speed. The tube T is then fed forwardly from the molding zone through a speed control 40, through a work station 50 which, as indicated in FIG. 1, may comprise a drilling work station 50A a or a slitting work station 50B, then through a cutting machine or station 60, and finally to a doffing and stacking station 70. Also as shown in FIG. 1, tube T may by-pass work station 50 and be fed forwardly from blow molding machine 30 through speed control 40 and directly to cutting station 60.

If work station 50 is in the form of a drilling work station 50A, it may include any suitable means for drilling drainage holes at spaced intervals along and around the tube being fed therethrough. By way of example, drilling work station 50A may be of the general type disclosed in my copending application Ser. No. 262,192, filed June 13, 1972, and entitled Method of Making and Processing Corrugated Plastic Pipe.

If work station 50 is in the form of a slitting work station 50B, as shown in FIG. 1, it may include a plurality of slitting saws or rotary cutting blades arranged around the tube and periodically moved into engagement with the tube for cutting slits in the valleys thereof. Slitting work station 50B may be of the general type disclosed in my copending application Ser. No. 271,379, filed July 13, 1972, and entitled Method and Apparatus for Forming Slits in Tubes. As is well known, it is custmary to provide round drainage holes in corrugated plastic piping used for septic tank fields or other drainage systems, and it is customary to provide a circularly arranged series of arcuate slits, usually in alternate valleys, in a corrugated tube used for an underground irrigation system. Accordingly, a detailed illustration of the work station 50 or either of its embodiments 50A or 50B, and an illustration of the drilled holes or slits in the tube is deemed unnecessary for the purpose of this disclosure.

A speed control or tension sensing device 40 is provided between the molding machine 30 and work station 50 for controlling the rate of feed of the tube through work station 50. The tube T emerging from molding zone 31 is still in a heated condition as it passes through work station 50 and has not entirely hardened at this point in the process. Accordingly, it is desirable to avoid stretching the tube lengthwise as well as to avoid compressive shortening of the tube. Speed control 40 is adapted to synchronize the rate of feed of tube T through work station 50 with the delivery rate of the tube as it emerges from molding zone 31. This permits obtaining a final tube product having a substantially uniform number of ribs and valleys per unit length thereof.

Referring more specifically to the speed control 40, as shown in FIG. 2 it includes a tension sensing arm 41 which engages tube T at a point between molding machine 30 and work station 50. Sensing arm 41 rests on the tube between a pair of spaced supporting rollers 42, 43 and permits the tube to slide freely thereunder. Tension sensing arm 41 is mounted at one end of a pivotally mounted counterbalance arm 44 having an adjustable counterbalance weight 45 at the opposite end thereof. A potentiometer or rheostat 47 is operatively connected to the pivotally mounted counterbalance arm 44 so as to vary the potentiometer in accordance with the position of the counterbalance arm 44. Potentiometer 47 is electrically connected to a drive means, not shown, in work station 50 for forwardly moving the tube therethrough at a rate of feed regulated by the potentiometer 47. Thus, as the tension in the tube increases, this results in a lifting of the tension sensing arm 41 which thereby reduces the rate of feed of the tube through work station 50. Conversely, if the tube becomes unduly slackened and the tension herein drops to a predetermined minimum permitting tension sensing arm 41 to move to a relatively lower position, potentiometer 47 will cause the drive means in work station 50 to increase the rate of feed of tube through the work station.

Cutting station 60, as shown in FIG. 2, includes a movable table 61 adapted for supporting the tube as it moves through the cutting station and having operatively connected therewith a motorized saw 62. Sensing switch 63 is mounted on table 61 and controls operation of the motorized saw 62. The sensing switch includes a sensing arm 64 which is positioned a predetermined distance downstream from the cutting blade of motorized saw 62. This distance essentially corresponds to the axial length of the enlarged coupler collar, so that as the molded tube passes through cutting station 60, the leading end of each successive enlarged coupler collar deflects sensing arm 64 of sensing switch 63 and actuates motorized saw 62. Accordingly, saw 62 transversely severs the tube at the juncture between the trailing end of each successive integral coupler collar and the adjoining tubular corrugated body. As is conventional, table 61 and motorized saw 62 are adapted to move longitudinally downstream with the forwardly moving tube during the cutting operation, and upon the cutting being completed, to return upstream to their original position ready for the next cutting operation.

As each successive length of the tube is cut, it is advanced forwardly of saw 61 and proceeds onto a supporting trough means 71 of the doffing and stacking station 70. Supporting through means 71 is located in substantial alignment with the path of travel of the corrugated tube throughout its movement from molding machine 30 through cutting station 60. Each successive cut length of tube or pipe is advanced onto the supporting trough means 71 by the leading end of the uncut tube pushing the trailing end of the previously cut length of pipe. As each successive length approaches the end of the supporting trough means 71, it engages a finger 72 of a doffing switch 73. Doffing switch 73 is operatively connected through suitable doffing controls 74 to actuate a pair of outwardly diverging doffer arms 75 projecting upwardly near each end of the doffing station. As each successive length of pipe is fully received in the doffing station 70, the doffer arms eject the pipe laterally into either of two hoppers 76, 77 which are positioned adjacent each side of the path of travel of the advancing pipes. A predetermined number of pipes are then accumulated in the hopper in stacked and nesting relation where they may be subsequently secured into bundles by tying with cord or other flexible binding elements.

FIGS. 5 and 6 show in detail the die blocks employed in the apparatus of the present invention. Each body-forming die block 32 has a concave semicircular mold surface which includes corrugations of alternating ribs 32a and valleys 32b and which cooperates wth a corresponding corrugated semicircular mold surface of a mating die block to form a generally cylindrical mold cavity with annular corrugations of alternating ribs and valleys along the axial length thereof. As shown in FIG. 6, each body-forming die block includes six semicircular ribs 32a with five valleys 32b between the ribs 32a and with half of a valley 32c on each end of the die block adjacent the outermost ribs 32a. When a cooperating pair of bodyforming die blocks is positioned in abutting end-to-end relation with other like cooperating pairs of body-forming die blocks, the mold cavity of each cooperating pair of die blocks cooperates with the mold cavity of abutting pairs of die blocks to form an elongate composite corrugated mold cavity having a continuous series of alternating ribs and valleys along the axial length thereof.

Each collar forming die block 33 is provided over a portion thereof adjacent one end of the die block with alternating ribs 33a and valleys 33b which are of substantially the same size and shape as the ribs 32a and valleys 32b of the body-forming die blocks 32. In the remaining portion of each collar-forming die block adjacent the opposite end thereof, two ribs are omitted so that each collar-forming die block has a portion 33c thereof having a relatively smooth, non-corrugated, substantially semicircular surface. This relatively smooth, non-corrugated portion 33c is of a diameter greater than that of the valleys 33b in the adjacent corrugated portion of collar-forming die block 33 and the valleys 32b in body-forming die blocks 32 so that the coupler collar molded in this portion will have an inside diameter greater than the outside diameter of the corrugated body portion of the tube, and will be capable of receiving therein the end portion of a tubular corrugated body.

The mating faces of cooperating pairs of collar-forming die blocks define a generally cylindrical mold cavity having a mold surface with annular corrugations of alternating ribs and valleys over one portion thereof and having a relatively short, substantially smooth, non-corrugated mold surface over the remaining portion of the mold cavity. The annular corrugations at the one end of the mold cavity cooperate with the corrugations in an abutting pair of body-forming die blocks to define a continuous series of annular corrugations.

As noted above, the diameter of the relatively smooth non-corrugated portion 33c of the collar-forming die blocks 33 is greater than the diameter of the valley portion 33b of the collar-forming die block or of the valley portions 32b of the body-forming die blocks. Thus when the end of collar-forming die block 33 including the relatively smooth noncorrugated portion 33c is positioned in abutting relation with a body-forming die block 32 as shown in FIG. 6, the half-valley portion 32c at the end of the body-forming die block 32 and the relatively smooth portion 33c of the collar-forming die block 33 are of different diameters and leave a relatively short wall 32d extending vertically between the two mold surfaces. This forms a corresponding vertical wall 83 (shown in FIG. 7) on the pipe 80 molded thereagainst. Accordingly, in order to eliminate having an inwardly extending lip at the open end of each severed collar, or an outwardly extending flange at the end of each corrugated body of the pipe, it is necessary to remove this inwardly extending wall 83. This may be accomplished during the cutting operation simply by using a saw with a fairly wide cut or kerf and locating the cut directly over this inwardly extending wall 83 as indicated by the lines 84 in FIG. 7.

Each of the semicircular non-corrugated relatively smooth portions 33c of the collar-forming die blocks 33 are provided with a pair of arcuately spaced inwardly extending relatively small projections 33d thereon for forming a corresponding set of spaced latching members 81 (FIGS. 7 and 8) on collars 82 to be molded against the surface 33c. Additionally, the projections 33d define areas of smaller internal diameter to aid in engaging the hot plastic material for stabilizing the same in the surrounding areas of said greater diameter, non-corrugated portions 33c of the mold surface of the collar forming die blocks 33 as the hot plastic material is received by the die blocks 33 from the extruder to prevent migration of the hot plastic material as it is being blown by the internal air pressure against the greater diameter portions 33c. These projections may be formed by means of separate inserts of the desired shape which are affixed to the smooth portion of the mold surface with adhesive, solder, screws, or other suitable means.

As can be seen in FIG. 6, each projection 33d is spaced axially inwardly from the end of the collar-forming die block 33 a substantially equal distance which is less than one-half the axial length of the relatively smooth non-corrugated portion 33c of the mold surface. The axial positioning of these projections is selected so that the inwardly projecting latching members formed on the enlarged collars will engage the corrugations on the end of a length of corrugated pipe received in the enlarged coupler collar. Preferably, the latching members are positioned to permit two ribs on a corrugated pipe to be received within the collar beyond the latching members. The projections 33d are spaced on the relatively smooth portion 33c of the mold surface so that the cooperating pairs of collar-forming die blocks form four latching members 81 spaced substantially equally apart around the inner circumference of each collar being molded. Preferably, these projections are wedge-shaped and have one surface thereof lying in a plane substantially perpendicular to the axis of the pipe and a second surface lying in a plane which is angularly oriented and converges inwardly from the smooth or collar-forming end of the die block. Projections of this shape form latching members on the collar which have an angularly oriented camming surface for facilitating insertion of a pipe into the coupler collar and a vertically extending latching surface for engaging corrugations on the corrugated pipe received in the collar.

As noted previously, the die blocks in each endless series are arranged in abutting relation with certain adjacent body-forming die blocks being spaced apart to receive a single collar-forming die block therebetween with its opposite ends abutting the adjacent spaced apart body-forming die blocks. This particular arrangement of die blocks provides a desirable degree of versatility to the present invention, in that the invention is adaptable for use with blow molding machines of various lengths. Thus, when the blow molding machine is relatively short, the die blocks may be arranged according to a first embodiment of the invention, as illustrated schematically in FIG. 3, wherein each endless series includes one collar-forming die block 33 which is positioned between and in abutting end-to-end relation with two adjacent spaced apart body-forming die blocks 32, and wherein the remaining die blocks in the series are abutting body-forming die blocks. Thus, the composite mold cavity, which is defined by the abutting pairs of cooperating die blocks as they move forwardly through blow molding zone 31, has an internal configuration whereby a single length of pipe L is formed with each complete revolution of the die blocks in their respective endless paths.

Where the blow molding machine is substantially longer, the die blocks may be arranged according to a second embodiment of the invention, as shown schematically in FIG. 4 wherein each of the opposing endless series of die blocks includes two collar-forming die blocks 33. These collar-forming die blocks are located at opposite respective ends of each series with an equal number of abutting body-forming die blocks intervening between each collar-forming die block in the series., Thus, according to this embodiment, a complete revolution of the die blocks in their respective endless paths will form two substantially identical lengths L of pipe. The arrow R in FIG. 4 indicates the length of pipe produced by one complete cycle or revolution of the die block along their respective endless paths.

It is generally desired in the industry that the corrugated plastic pipes used for septic tank fields, irrigation purposes and the drainage of foundations or buildings be available in lengths of approximately 10 feet. Thus, in order to form pipes approximately 10 feet long on the blow molding machine illustrated in FIG. 3, each endless series includes 30 die blocks and each die block is approximately four inches in length so that the total length of all the die blocks in each series is approximately 10 feet. In the blow molding machine of FIG. 4, however 60 die blocks of approximately four inches in length are employed so that the total length of all the die blocks in each series is approximately 20 feet.

It should be apparent that a different number of die blocks from that shown in FIGS. 3 and 4 may be employed in the blow molding machine in accordance with this invention. The number of die blocks employed in each series is generally dictated by such parameters as the size of the blocks employed, the length of the corrugator, and the desired length of repeat between successive coupler collars.

It should also be apparent that additional pairs of collar-forming die blocks may be included in the two series, if desired, to form a larger number of pipes of shorter length with each complete cycle or revolution of the die blocks in each series.

In the drawings and specification, there have been set forth preferred embodiments of the invention and although specific terms are employed, they are used in a generic and descriptive sense only and not for purposes of limitation.

That which is claimed is:

1. Apparatus for continuously making plastic pipes, each having an elongate tubular corrugated body and an enlarged coupler collar provided with latching members on one end of the body, said apparatus comprising, an extruder for continuously extruding hot plastic naterial in the form of a tube.

a series of cooperating pairs of forwardly moving die blocks defining a molding zone for receiving and molding the tube of hot plastic material, most of the pairs of die blocks being body-forming die blocks having an annularly corrugated concave inner surface defining at body-forming mold cavity, at least one of the cooperating pairs of die blocks being collar-forming die blocks having non-corrugated generally cylindrical inner surface portions defining a collar-forming mold cavity of greater diameter than said body-forming mold cavities, said pair of collar-forming die blocks also having a plurality of arcuately spaced, relatively small projections carried by and extending inwardly from said generally cylindrical inner surface portions for forming inwardly projecting latching members on each collar being molded, said projections defining areas of smaller internal diameter to aid in engaging the hot plastic material for stabilizing the same in the surrounding areas of said greater diameter cylindrical mold cavity to prevent migration of the hot plastic material, means for creating a pressure differential in said molding zone of a higher pressure inside the hot plastic tube as compared to the outside of the tube to expand the hot plastic tube against said mold cavities and thereby form a series of successive, closely spaced elongate corrugated tubular bodies with interconnected relatively short collars having integrally formed latching members, between the adjacent corrugated tubular bodies, and tube severing means spaced downstream of said molding zone for successively transversely severing the tube along the juncture between the end of the enlarged collar and the adjoining tubular corrugated body to thereby form a plurality of pipes, each having at one thereof a relatively short integral enlarged coupler collar having integrally formed latching members thereon.

2. Apparatus according to claim 1 wherein said plurality of arcuately spaced, relatively small projections carried by and extending inwardly from said generally cylindrical inner surface portions of said collar-forming die blocks comprise a set of projections on each of the die blocks.

3. Apparatus according to claim 1 wherein said plurality of arcuately spaced, relatively small projections carried by and extending inwardly from said generally cylindrical inner surface portions of said collar-forming die blocks comprise substantially equal spaced apart projections.

4. Apparatus according to claim 1 wherein said cooperating pairs of collar-forming die blocks also have annularly corrugated inner surface portions thereon.

5. Apparatus according to claim 1 further comprising means positioned downstream of said severing means for accumulating and stacking the severed pipe in stacked nesting relation preparatory to securing the stacked nested pipes into bundles.

6. Apparatus for continuously making plastic pipes, each having an elongate tubular corrugated body and an enlarged coupler collar provided with latching members on one end of the body said apparatus comprising, an extruder for continuously extruding hot plastic material in the form of a tube, a series of cooperating pairs of forwardly moving die blocks defining a molding zone for receiving and molding the tube of hot plastic material, most of the pairs of die blocks being body-forming die blocks having an annularly corrugated concave inner surface defining a body-forming mold cavity, several of the cooperating pairs of die blocks being collar-forming die blocks spaced apart from each other with a series of said body-forming die blocks therebetween, each of said collar-forming die blocks having non-corrugated generally cylindrical inner surface portions defining a collar-forming mold cavity of greater diameter than said body-forming mold cavities, said pairs of collar-forming die blocks also having a plurality of arcuately spaced, relatively small projections carried by and extending inwardly from said generally cylindrical inner surface portions for forming inwardly projecting latching members on each collar being molded, said projections defining areas of smaller internal diameter to aid in engaging the hot plastic material for stabililzing the same in the surrounding areas of said greater diameter cylindrical mold cavity to prevent migration of the hot plastic material.

means for creating a pressure differential in said molding zone of a higher pressure inside the hot plastic tube as compared to the outside of the tube to expand the hot plastic tube against said mold cavities and thereby form a series of successive, closely spaced elongate corrugated tubular bodies with interconnected relatively short collars having integrally formed latching members, between the adjacent corrugated tubular bodies, and tube severing means spaced downstream of said molding zone for successively transversely severing the tube along the juncture between the end of the enlarged collar and the adjoining tubular corrugated body to thereby form a plurality of pipes, each having at one end thereof a relatively short integral enlarged coupler collar having integrally formed latching members thereon.

7. Apparatus according to claim 6 wherein said plurality of arcuately spaced, relatively small projections carried by and extending inwardly from said generally cylindrical inner surface portions of said collar-forming die blocks comprise a set of projections on each of the die blocks.

8. Apparatus according to claim 6 wherein said plurality of arcuately spaced, relatively small projections carried by and extending inwardly from said generally cylindrical inner surface portions of said collar-forming die blocks comprise substantially equally spaced apart projections.

9. Apparatus according to claim 6 wherein said cooperating pairs of collar-forming die blocks also have annularly corrugated inner surface portions thereon.

10. Apparatus according to claim 6 further comprising means positioned downstream of said severing means for accumulating and stacking the severed pipe in stacked nesting relation preparatory to securing the stacked nested pipes into bundles.

* * * * *

UNITED STATES PATENT OFFICE
CERTIFICATE OF CORRECTION

Patent No. 3,859,025                    Dated January 7, 1975

Inventor(s) Ernest J. Maroschak

It is certified that error appears in the above-identified patent and that said Letters Patent are hereby corrected as shown below:

Column 1, Line 36, "accordingly" should be -- according --; Line 39, delete "a". Column 2, Line 2, change "jold" to --mold--; Line 27, change "successively" to --successive--. Column 3, line 13, "of" first occurrence, should be -- or --. Column 4, line 5, delete the first occurrence of "a". Column 5, Line 6, "herein" should be --therein--; Line 37, "through" should be --trough--. Column 8 Line 14, delete the comma "," following the period "."; CLAIM 1, Line 57, "naterial" should be --material--; Line 63, "at" should be --a--. Column 9, Line 27, CLAIM 1, after "one" insert --end--. Column 10, Line 20, CLAIM 6, delete the period "." after "material" and insert -- , --.

Signed and sealed this 11th day of March 1975.

(SEAL)
Attest:

RUTH C. MASON
Attesting Officer

C. MARSHALL DANN
Commissioner of Patents
and Trademarks